Oct. 23, 1956 C. WEEKS 2,767,946
SUPPORT FOR NEON TUBING
Filed Aug. 5, 1953

Inventor
Charles Weeks
by Bair, Freeman & Molinare
Attys.

United States Patent Office 2,767,946
Patented Oct. 23, 1956

2,767,946
SUPPORT FOR NEON TUBING

Charles Weeks, Menlo Park, Calif.

Application August 5, 1953, Serial No. 372,484

1 Claim. (Cl. 248—50)

This invention relates to a support for glass tubing and the like and more particularly to a support for neon tubing which may be subject to vibration or impact.

Glass neon tubing is very fragile. When neon tubing is firmly secured to a support which is subject to vibration or impact there is a great possibility of breakage of the fragile tubing.

It is the object of this invention to provide a novel support for glass tubing and the like, such as neon tubing, which support holds the tubing securely while providing means for accommodating vibration and impact.

In accomplishing the above object it is necessary to provide a support which holds the glass tubing securely but non-rigidly. Furthermore, in order to have such supports commercially practical it is necessary that they be functional, inexpensive, and of simple construction. The use of rubber pads or shock absorbers would make the cost of a support prohibitively high in comparison with ordinary supports.

Accordingly, it is another object of this invention to provide a novel glass support which provides means for holding the glass tubing securely and non-rigidly.

A further object of this invention is to provide a glass tubing support which accomplishes the above set forth objectives and which is characterized by its simplicity and inexpensiveness of construction.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which.

Figure 1:
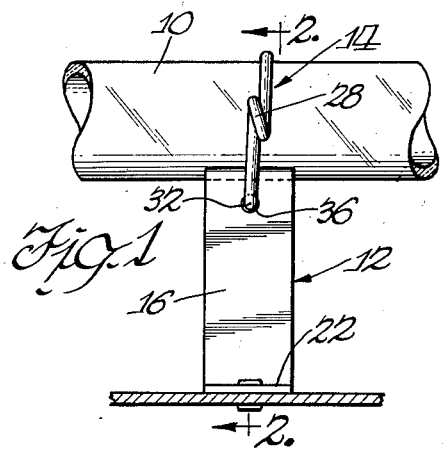
Figure 1 is a side elevation view of one form of glass tubing support constructed and functioning in accordance with the principles of the invention.

Referring now to the figures, there is shown in Figure 1 a glass tube 10, such as neon tubing or the like, and a support for the glass tube. The support includes a support member generally indicated at 12, and a resilient clamping member generally indicated at 14.

The support member 12, as shown, is of inverted U-shape defining legs 16 and 18, and bight 20 joining the legs at one end. The extended ends of legs 16 and 18 have flanges 22 formed thereon, providing means for attaching the support member 12 to a mounting 24 therefor. As shown, the support member 12 is riveted to mounting 24, but any appropriate means may be used for fastening support member 12 to mounting 24. The bight 20 of the U-shaped support member 12 is dished, recessed, or made concave on the outer side thereof to form a saddle, or the like, for receiving therein the neon tube 10.

Figure 2:
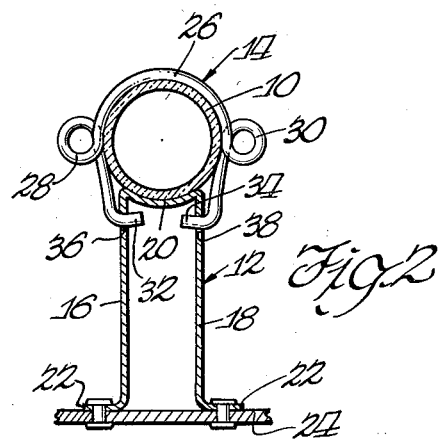
Figure 2 is a view taken on line 2—2 of Figure 1.
Figure 3:
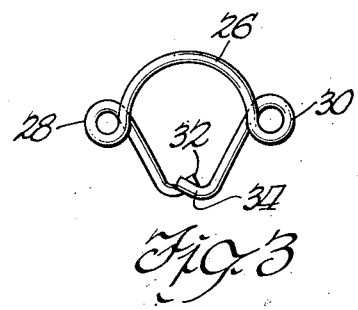
Figure 3 shows the spring clip which is part of the support shown in Figures 1, 2, and 4.

The resilient clamping member 14, as shown in Figures 1 to 4, consists of an elongated wire of spring steel or the like, shaped to the particular clip configuration shown in Figure 3. The wire clip 14 defines a concavely curved central portion 26 adapted to be positioned in oppositely facing relation to the concave saddle formed in bight 20. The wire clip 14 also defines a pair of loops 28 and 30 at the ends of said concavely curved portion 26. The clip 14 further has terminal ends 32 and 34 which are turned in toward each other.

Figure 4:
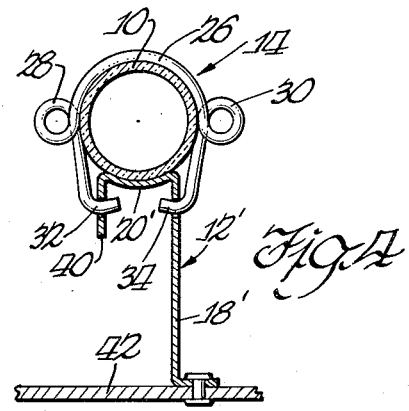
Figure 4 is a view similar to Figure 2 and shows a modified form of the support.

The legs 16 and 18 of support member 12 have apertures 36 and 38 formed therein adjacent the bight 20, which apertures provide abutment means on the support member and which apertures are adapted to receive therein the terminal ends 32 and 34 of the clip 14 in the manner as shown in Figures 1, 2, and 4.

The clip 14 is preshaped, preferably as shown in Figure 3, and in its normal condition the terminal ends 32 and 34 are shaped to define hook means thereat and are spaced closely to each other and may even overlap, as shown. In order to mount clip 14 on support 12, the ends 32 and 34 must be spread apart against the resiliency of the spring steel of which the clip 14 is formed. The loops 28 and 30 contribute to the resiliency of clip 14 and to the tendency for restoration to its normal condition. Loops 28 and 30 further afford limited expansion means for accommodating tubes 10 of varying diameter.

The size of the clip is so designed that when the arcuate portion 26 of the spring clip engages the top of tube 10, it is necessary that the terminal ends 32 and 34 of the spring clip 14 be pulled downwardly to force said terminal ends into the apertures 36 and 38 in the support 12. Such pulling down of the terminal ends tends to reduce the diameter of the loops 28 and 30 of clip 14 and thus creates a tension in said loops. Since the material tends to return to its original shape, the effect of the tension thus established is to hold the tubing 10 securely but yieldingly against saddle 20 of the support 12.

In the modified form shown in Figure 4, the modification consists of providing a U-shaped member 12' having one short leg 40 and other leg 18' adapted for connection to a mounting 42. Support member 12' provides for greater freedom of movement and for greater deflection of the saddle portion 20' of the support with respect to the mounting 42 than may be achieved with support 12 shown in Figures 1 and 2.

Figure 5:
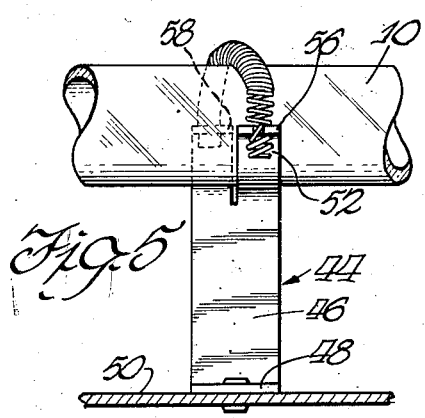
Figure 5 is a view similar to Figure 1 and shows another modified form of support.
Figure 6:
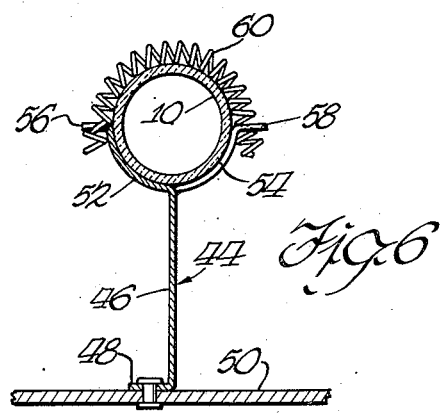
Figure 6 is a view similar to Figure 2 and shows another view of the modified form of the support shown in Figure 5.

In the modified form shown in Figures 5 and 6, the support member 44 has a single leg 46, and a mounting flange 48 formed at one end thereof adapted to be secured to a mounting 50. The opposite end of support member 44 is bifurcated longitudinally to form a pair of arms 52 and 54 which are bent from the plane of leg 46 in opposite directions to form a support of generally Y-shape. The arms 52 and 54 are concaved over a portion of their length to form an arcuate saddle, or recess, for receiving a glass tube 10. The terminal ends of arms 52 and 54 have bifurcated flanges 56 and 58 formed therein which extend in opposite directions with respect to each other and are disposed substantially in the same plane.

There is provided a resilient clamping member 60 which, in this particular modification, is an elongated wire of resilient springy material, such as spring steel, shaped and formed into an elongated coil spring. The terminal ends of the coil 60 are adapted to be fitted into the slots in bifurcated flanges 56 and 58, so as to position portions of the coil spring 60 on opposite sides of each bifurcated flange, thus providing means for securing the coil 60 to the support member 44 as shown in Figures 5 and 6. The coil spring 60, being extensible, affords means for accommodating tubes 10 of varying cross-section dimension.

The supports 12, 36, and 44 may be formed to their final configurations, by stamping or the like, from a blank of sheet metal, or the like. The clip 14 and the coil 60 are simply pre-formed wire members. Thus, the support and the clamping member may be simply and inexpensively produced—and the combination of the two provides a very simple support for glass tubes and the like, which serves to hold a glass tube firmly but non-rigidly.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

A support for glass tubing comprising a support member shaped and formed to define a portion adapted for securement to a mounting and a depressed saddle portion adapted to receive thereon a glass tube, opposed portions of said support member adjacent said depressed saddle portion having abutment means thereon, and a resilient member secured adjacent its ends to said abutment means, said resilient member adapted to cooperate with said depressed saddle to surround the glass tube positioned in said depressed saddle and to resiliently clamp said glass tube against said depressed saddle, said resilient member comprising a spring wire clip having a central arcuate portion positioned directly opposite said saddle, the glass tube positioned in said saddle with said central arcuate portion positioned directly opposite said saddle, a pair of loops formed at the ends of said central arcuate portion, and turned-in terminal ends which, in the unstressed clip, are normally positioned closely adjacent each other, said turned-in terminal ends of said clip adapted to be spread away from each other for fitting the clip over the glass tube carried by said support member, and said turned-in terminal ends of the clip providing hook means for securement of said clip to the abutment means on said support member.

References Cited in the file of this patent

UNITED STATES PATENTS

| | | |
|---|---|---|
| 1,232,690 | Keenan | July 10, 1917 |
| 1,722,363 | Young | July 30, 1929 |
| 2,547,813 | Coons | Apr. 3, 1951 |

FOREIGN PATENTS

| | | |
|---|---|---|
| 244,671 | Switzerland | of 1947 |
| 736,735 | France | of 1932 |